United States Patent Office 3,243,394
Patented Mar. 29, 1966

3,243,394
STABILIZATION OF CHLORINATED ETHYLENE POLYMERS
Richard E. Dietz, Bartlesville, Okla., assignor to Phillips Petroleum Company, a corporation of Delaware
No Drawing. Filed July 25, 1960, Ser. No. 44,847
11 Claims. (Cl. 260—23)

This invention relates to chlorinated ethylene polymers. In another aspect this invention relates to the stabilization of chlorinated polyethylene.

The product of solid polymers of ethylene is known. It is also known to chlorinate such polymers which range in properties from rubbery to brittle. The rubbery polymers can be molded to form shaped articles such as bottles and other containers, or they can be extruded to form tubing or filaments. They can be formed into films useful for wrapping foods, used to coat surfaces for protection thereof and for electrically insulating wires, as well as many other uses. While chlorinated polyethylene has many advantages, its tendency to evolve hydrogen chloride at elevated temperatures leads to corrosion of molds and processing machinery, to deterioration of color and development of odor, all of which are objectionable for many commercial applications.

Since similar problems have long been recognized in the processing and utilization of polyvinyl chloride resins and a voluminous art has been developed for their solution in these materials, it would appear that stabilization of chlorinated ethylene polymers might be effected in a similar manner. I have found, however, that there are differences inherent in these resins and that the problem of stabilization of chlorinated polyethylene requires a different approach from that for polyvinyl chloride. For example, it is generally accepted that in polyvinyl chloride, hydrogen chloride acts autocatalytically for its own production. Thus one procedure developed for these resins involves incorporation of a hydrogen chloride acceptor such as a Group I, II, III or IV metal salt of a high molecular weight carboxylic acid which will react with any hydrogen chloride formed and remove it as a cause for initation of degradation. Cadmium and barium ricinoleates are particularly effective as hydrogen chloride acceptors. Such autocatalysis does not occur in chlorinated polyethylene and while removal of hydrogan chloride to reduce its corrosive effect by the incorporation of hydrogen chloride acceptors is desirable, it does not change the rate of degradation.

Another procedure proposed for stabilization of polyvinyl chloride involves incorporation of organic inhibitors such as certain bisphenols, organophosphates, epoxy compounds and the like, their purpose being to maintain stability of the resin molecule. I have found that for chlorinated polyethylene, such stabilizers are effective for short periods only.

Attempts to use the metal salts of organic acids in stabilizing systems for chlorinated polyethylene have shown that while they have an effective stabilizing effect in my composition, they are frequently incompatible with the polymer and impart cloudiness or haze thereto. This effect is greatly emphasized when the resin containing the metal salt is subjected to orientation such as by drawing or sharp bending.

I have now discovered that if the organic radical of the metal salt contains chlorine, preferably in a carbon to chlorine ration approaching that of the chlorinated polyethylene to be stabilized, the stabilizer is rendered compatible with said chlorinated polyethylene. Preferably the chlorine content (weight basis) of the organic radical of the salt is within 75 and 125 percent of the chlorine content of the chlorinated polyethylene.

I have also discovered that stabilization of chlorinated polyethylene can be effected by incorporation therein of a three component stabilizing system comprising a metal salt of an organic acid, an organic inhibitor and an antioxidant. The organic inhibitor is an organic ester of a phosphorous acid and the antioxidant is an alkylene-bis alkyl-substituted cresol. By the method of my invention, chlorinated polyethylene can be effectively stabilized against color deterioration and odor development. The stabilized products show no development of hydrogen chloride for more than an hour at a temperature of 360° F. in the presence of a stream of air. The stabilizers are quite easily incorporated in the resin and, furthermore, when the organic radical of the metal salt component is chlorinated, the stabilizers are compatible with the chlorinated polymer.

It is an object of this invention to provide a stabilized chlorinated ethylene polymer.

It is another object of this invention to provide a compatible composition for stabilization of chlorinated ethylene polymer.

Another object is to provide a method of stabilizing chlorinated ethylene polymer against evolution of hydrogen chloride.

Other objects, advantages and features will be apparent to those skilled in the art from the following discussion.

According to one aspect of my invention a chlorinated ethylene polymer is stabilized against degradation by incorporating therein a three component stabilizing composition including a Group I, II, III or IV metal salt of an organic acid, an organic stabilizer and an antioxidant.

According to another aspect of my invention a chlorinated ethylene polymer has incorporated therein a Group I, II, III or IV metal salt of an organic acid containing chlorine in the organic radicals of said salt.

The metal salts of organic acids useful in this invention are hydrogen chloride acceptors and are metal salts of high molecular weight carboxylic acids. The carboxylic acid radical will generally contain 10 to 24, preferably 10 to 20 carbon atoms and the metal is one of Group I, II, III or IV of the Periodic System according to Mendeleeff. These metals include sodium, potassium, lithium, magnesium, calcium, strontium, barium, zinc, cadmium, lead tin, and the like. The Group II metals are preferred and especially suitable are barium, cadmium and zinc. Typical of these compounds are barium decanoate, barium laurate, barium palmitate, barium stearate, barium myristate, barium arachidate, barium ricinoleate, barium oleate, and the like; cadmium decanoate, cadmium laurate, cadmium palmitate, cadmium stearate, cadmium oleate, cadmium arachidate, cadmium ricinoleate, cadmium behenate, and the like; zinc decanoate, zinc laurate, zinc palmitate, zinc stearate, zinc myristate, zinc arachidate, zinc ricinoleate, zinc oleate, zinc behenate, zinc 2,4-diethylarachidate and the like; and their sodium, potassium, lithium, strontium, lead, and tin analogues.

The organic inhibitors useful in my invention are organo-phosphates and organo-phosphites. These compounds can be represented by the following general formulae:

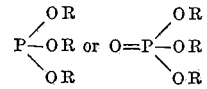

in which R is an alkyl or an aryl group, these groups being the same or different. Preferably at least one R is phenyl and at least one is an alkyl group containing from four to ten carbon atoms. Typical of such compounds are diphenyl t-butyl phosphite, diphenyl heptyl phosphite, phenyl dioctyl-phosphite, phenyl didecyl phosphite, diphenyl octyl phosphite, and the like; and diphenyl butyl phosphate, diphenyl amyl phosphate, phenyl dihexyl phosphate, diphenyl heptyl phosphate, phenyl dioctyl phosphate, diphenyl decyl phosphate and the like. Also useful are triphenyl phosphite, tributyl phosphite, trioctyl phosphite, triphenyl phosphate, triamyl phosphate, tridecyl phosphate, and the like. As will be apparent, these compounds are esters of phosphorous and phosphoric acids.

The preferred antioxidants for use in the stabilization systems of the present invention are compounds having the general formula:

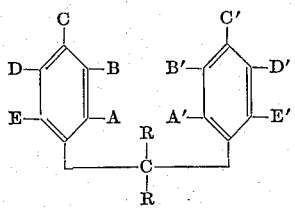

wherein one of the group A, B, C, D and E is a hydroxyl group, two are hydrogen, one is a methyl and another is an alkyl group containing from 1 to 10 carbon atoms, A', B', C', D' and E' are selected in the same manner, and R and R' are hydrogen or alkyl groups with not more than 9 carbon atoms in the sum of the R and R' groups. Examples of these compounds include 4,4'-methylene-bis-(2,5-xylinol),
4,4'-ethylidene-bis-(6-ethyl-m-cresol),
4,4'-butylidene-bis-(6-tert-butyl-m-cresol),
4,4'-decylidene-bis-(6-methyl-m-cresol),
4,4'-methylene-bis-(2-amyl-m-cresol),
4,4'-propylidene-bis-(5-hexyl-m-cresol),
4,4'-isopropylidene-bis-(6-methyl-m-cresol),
3,3'-decylidene-bis-(5-ethyl-p-cresol),
2,2'-butylidene-bis-(3-n-hexyl-p-cresol),
4,4'-(2-butylidene)-bis-(6-tert-butyl-m-cresol);
3,3'-(4-decylidene)-bis-(5-ethyl-p-cresol);
(2,5-dimethyl-4-hydroxyphenyl)(2-hydroxy-3,5-dimethylphenyl)methane;
(2-methyl-4-hydroxy-5-ethylphenyl)(2-ethyl-3-hydroxy-5-methylphenyl)methane;
(3-methyl-5-hydroxy-6-tert-butylphenyl)(2-hydroxy-4-methyl-5-decylphenyl)-n-butylmethane;
(2-hydroxy-4-ethyl-5-methylphenyl)(2-decyl-3-hydroxy-4-methylphenyl)butylamylmethane;
(3-ethyl-4-methyl-5-hydroxyphenyl)-(2,3-dimethyl-3-hydroxyphenyl)nonylmethane,
(3-methyl-2-hydroxy-6-ethylphenyl)-(2-isopropyl-3-hydroxy-5-methylphenyl)cyclohexylmethane;
(2-methyl-4-hydroxy-5-methylphenyl)(2-hydroxy-3-methyl-5-ethylphenyl)dicyclohexylmethane and the like.

The antioxidants preferred for my invention are the 4,4'-lower alkylene-bis (lower alkyl-m-cresol)'s where by lower alkylene and lower alkyl I mean those radicals containing from 1 to 6 carbon atoms. In such compounds (referring to the above general formula) C and C' are preferably the hydroxyl groups and A and A' or E and E' are methyl groups while B and B' or D and D' are lower alkyls.

The amount of hydrogen chloride acceptor and organic inhibitor added will usually be about the same and will generally be in the range 0.05 to 5, preferably between 0.1 and 3 parts by weight per 100 parts resin. The antioxidant component can be present in considerably smaller amounts generally in the range 0.01 to 1 and preferably between 0.05 and 0.5 part by weight per hundred parts resin. For example, a typical formulation can be 100 parts chlorinated polyethylene containing 25±1 percent chlorine, one part barium stearate, 1 part triphenyl phosphite, and 0.1 part 4,4'-butylidene-bis-(6-tert-butyl-m-cresol) all parts being by weight. Larger amounts of any of the components can be employed although overloading can be detrimental in some instances, e.g., with the hydrogen chloride acceptors of the type described above which have a low level of compatibility.

Incorporation of the stabilizing system of the present invention can be effected in any suitable manner, such as for example on a roll mill or in a Banbury mixer.

As has been indicated, I have also found that the metal salts of organic acids as described above are rendered compatible by incorporating chlorine in the molecule. The materials are of the general formula $$[(RCl_x)COOO]_yMe$$

wherein R is a saturated hydrocarbon group, e.g., an alkyl radical containing from 9 to 23 carbon atoms, $x$ is an integer in the range from 1 to the number of carbon atoms in R, $y$ is a number equal to the valence of the metal and Me is a metal of Group I, II, III or IV of the Periodic System. Examples of such compounds include barium monochlorocapronate, cadmium dichlorolaurate, barium dichloromyristate, lead dichloropalmitate, barium dichlorostearate, cadmium dichlorostearate, lead trichloroarachidate, tin pentachlorolignocerate, lead monochloronaphthenate, strontium monochlorostearate, zinc monochlorostearate, and the like.

These chlorine containing metal salts of organic acids can be prepared by any method known to the art. One method for preparing such compounds is to prepare the chlorinated acid and convert it to the salt by adding a solution of the chloride of the desired metal. The metal salt is recovered, washed and dried and incorporated in the polymer by any suitable means as indicated above for incorporating the three component stabilizing compositions.

These chlorine containing salts are present as hydrogen chloride acceptors and are desirable along or with other inhibitors which tend to reduce the tendency of dehydrochlorination such as the antioxidants and/or organic stabilizers as described above.

The hydrogen chloride acceptors are used in the range indicated above but are preferably used in an amount which will provide from 0.25 to 7.5 milligram atoms of metal per 100 grams of polymer.

While these chlorine containing metal salts are particularly adapted for use in chlorinated polyethylene containing from as low as 1.0 weight percent chlorine up to the theoretical maximum, e.g., about 87 percent, because of their compatibility in these materials, they are also useful as stabilizers in other chlorine containing polymers in which the problem of dehydrochlorination exists.

By chlorinated polyethylene and chlorinated polymers of ethylene, I intend to include the homopolymer and those polymers prepared by polymerizing a monomer system comprising at least 75 parts by weight ethylene and the remaining monomer being an aliphatic olefin, especially other monoolefins of 3 to 8 carbon atoms such as propylene, butene-1, butene-2, pentene-1, 4-methylpentene-1, hexene-1, 4-ethylhexene-1, heptene-1, octene-1, and the like. Of the copolymers the ethylene/propylene copolymers and the ethylene/1-butene copolymers wherein the ethylene makes up at least 90 weight percent of the copolymer are especially preferred. Preferably my stabilizing system is used with ethylene polymers which contain about 15 to 50 weight percent chlorine.

This invention will be further described by the following examples.

EXAMPLE I

*Preparation of chlorinated barium stearate*

Two solutions, one of 50 grams of triple pressed stearic acid in 500 ml. carbon tetrachloride, and one of about 36 grams of elemental chlorine in 450 ml. carbon tetrachloride were prepared. The stearic acid solution was charged to a one-liter flask fitted with a stirrer and reflux condenser. The chlorine solution was added slowly to the stearic acid solution while irradiating with a 100-watt mercury arc lamp. In about five minutes, vigorous reaction was initiated after which the rate of addition of the chlorine solution was regulated to maintain the system at reflux temperatures. Total time for addition of the chlorine solution was 25 minutes.

When reaction had ceased, the contents of the flask were poured into a shallow tray and allowed to weather off carbon tetrachloride at about 100° F. At the end of 200 hours about 300 ml. of liquid remained. This liquid was placed in a vacuum oven at 212° F. for five hours to complete the removal of carbon tetrachloride. While still hot, the remaining liquid was poured into a solution of seven grams of sodium hydroxide in 1200 ml. water and stirred vigorously for 15 minutes, the temperature being about 158° F. (70° C.). A thick layer of foam formed during this period. An aqueous solution of barium chloride was then added dropwise, with stirring until the foam disappeared. Stirring was continued at 158° F. for one hour. The barium salt precipitated as a waxy material which agglomerated into balls about one inch in diameter. The liquid phase was decanted and the agglomerates broken up and washed in distilled water at 158° F. after which it was separated and dried in a vacuum oven at 210° F.

Since all chlorine color disappeared, it was assumed that the chlorination of the stearic acid was quantitative, i.e., of the chlorine substituted, 18 grams entered the molecule and 18 grams were converted to hydrogen chloride. Thus approximately three grams atoms of chlorine entered the stearic acid molecule and the barium salt would have the formula $(C_{17}H_{32}Cl_3O_2)_2Ba$.

*Preparation of barium stearate*

Fifty grams of stearic acid (triple pressed) were added to a solution of seven grams of sodium hydroxide in about 2 liters of water and heated to 158° F. at which time a thick layer of foam was formed. An aqueous solution of barium chloride was then added dropwise with stirring until foam had disappeared. Stirring was continued at 158° F. for about 30 minutes, after which the mixture was cooled to room temperature and the barium stearate removed on a filter. The filter cake was reslurried in water at 158° F., cooled again and filtered. The barium stearate product was dried in a vacuum oven for six hours at 210° F.

Two runs were made to compare the compatibility of the chlorinated barium stearate and the unchlorinated barium stearate by adding these materials at a level of two parts by weight per 100 parts of chlorinated polyethylene containing 25.4 percent chlorine. The material was added to the polymer on a roll mill heated with 100 p.s.i.g. steam. The material was compounded for three minutes. Slabs were cast from the material and tested for compatibility. When strips cut from the material containing the chlorinated barium stearate were stretched, the strips remained clear showing compatibility. Strips cut from the material containing the barium stearate when stretched became cloudy to such an extent that transparency was lost.

EXAMPLE II

A series of runs were made to compare the stabilizing effects of the barium stearate and the chlorinated barium stearate in chlorinated polyethylene containing 24.8 weight percent chlorine. The materials were blended for 3 minutes on a roll mill at 280° F. (50 p.s.i.g. steam in the rolls). In order to have equivalent amounts of barium in each sample 1 part by weight of barium stearate was added to 100 parts of polymer and 1.33 parts of chlorinated barium stearate was added to 100 parts of polymer. Polymer with no stabilizer was reserved as a control.

Test slabs 1.5″ x 3″ were molded on glass plate having an etched surface and using 2.75±0.25 grams of the compositions and tested for thermal evolution of hydrogen chloride as follows:

The slab was placed in a cell connected by a tube to a compressed air source and by a second tube to a gas diffuser, the latter being immersed in a titration cell. The cell containing the slab was sealed and immersed in an oil bath heated to 360° F. The titration cell contained water, made slightly basic to phenolphthalein. A slow stream of air was passed through the system to sweep any evolved gases into the titration vessel. In the gas line between the air source and the tube containing the slab was placed a small amount of ascarite to absorb carbon dioxide and water. The air flow was regulated to 300 ml./minute. The time was recorded when the specimen was placed in the bath. When the color of the solution had just disappeared, the solution was titrated with 0.011 normal potassium hydroxide, the time being recorded at each titration.

The results are shown in Table I.

TABLE I

| HCl Evolved (Mg.) | Time Required (Min.) | | |
|---|---|---|---|
| | Control Unstabilized Polymer | Polymer Stabilized with— | |
| | | Barium Stearate | Chlorinated Barium Stearate |
| 0.12 | 11.0 | 15.0 | 13.0 |
| 0.57 | 14.0 | 22.0 | 20.0 |
| 1.1 | 15.5 | 27.0 | 14.0 |
| 1.8 | 17.5 | 33.0 | 29.0 |
| 3.6 | 22.0 | 47.0 | 38.0 |
| 5.5 | 27.0 | 60.0 | 48.0 |

As shown by the above data, the chlorinated barium stearate compares favorably with unchlorinated barium stearate in serving to retard the evolution of HCl from chlorinated polyethylene.

EXAMPLE III

A series of runs were made according to the procedure described in Example II using chlorinated polyethylene containing approximately 25 weight percent chlorine. Members of the three-component stabilizing system of this invention were incorporated into the chlorinated polyethylene in various combinations. The HCl acceptor was barium stearate, the organic inhibitor was diphenylheptylphosphite, and the antioxidant was 4,4′-butylidene-bis-(6-tert-butyl-m-cresol). Samples were compounded as follows:

| Sample | HCl Acceptor (phr.) | Organic Inhibitor (phr.) | Antioxidant (phr.) |
|---|---|---|---|
| 1 | 0 | 0 | 0 |
| 2 | 1.0 | 0 | 0 |
| 3 | 1.0 | 1.0 | 0 |
| 4 | 0 | 1.0 | 0.1 |
| 5 | 1.0 | 1.0 | 0.1 |

The compositions were tested for HCl evolution as described in Example II and the results are shown in Table II.

TABLE II
[HCl evolution]

| Sample 1 | | Sample 2 | | Sample 3 | | Sample 4 | | Sample 5 | |
|---|---|---|---|---|---|---|---|---|---|
| Min. | Mg. HCl | Min. | Mg. HCl | Min. | Mg. HCl | Min. | Mg. HCl | Min. | Mg. HCl |
| 11 | .198 | 16 | .198 | 45 | .198 | 15 | .198 | 85 | .198 |
| 12 | .397 | 21 | .495 | 47 | .397 | 19 | .79 | 107 | .397 |
| 14 | .794 | 25 | 1.19 | 51 | .79 | 23 | 1.59 | 120 | .495 |
| 15 | 1.19 | 29 | 1.98 | 56 | 1.59 | 26 | 2.38 | | |
| 17 | 1.98 | 37 | 3.18 | 60 | 2.38 | 30 | 3.97 | | |
| 23 | 3.97 | 42 | 3.97 | 69 | 3.97 | | | | |

The data of Table II clearly show a synergistic result for the 3-component stabilizing system. The reduction in HCl evolution for sample 5 is unexpectedly superior to results obtained with samples 2–4 and far exceeds the sum of the effects evidenced for the components individually.

EXAMPLE IV

Three runs were made as described in Example III using a different chlorinated polyethylene containing 24.7 weight percent chlorine. For the control containing no stabilizer there was an induction period of 13 minutes before HCl evolution was observed and 10 mg. of HCl evolved in 100 minutes. For a specimen containing 0.1 phr. of the antioxidant only, 4,4'-butylidene-bis-(6-tert-butyl-m-cresol), the results were the same as for the control. For a specimen stabilized with the three component system as used for sample 5, Example III, however, there was an induction period of 180 minutes before HCl evolution was observed.

It is thus evident that the 3-component stabilizer system of my invention is very effective in stabilizing chlorinated ethylene polymers. I have found that the chlorinated organic acid salts can be used in the 3-component system with improved compatibility with the chlorinated ethylene polymer over the unchlorinated organic acid salts.

The chlorinated polyethylenes employed in the above examples were all obtained by chlorinating polyethylene having a density of about 0.960 gram per cubic centimeter at 25° C. Density of these polymers can be determined.

In density determinations the specimens should be prepared by compression molding the polymer at 340° F. until completely molten followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature.

Density is determined by placing a smooth, void-free pea-sized specimen cut from a compression molded slab of the polymer in a 50-ml., glass-stoppered graduate. Carbon tetrachloride and methyl cyclohexane is added to the graduate from burettes in proportion such that the specimen is suspended in the solution.

As will be evident to those skilled in the art, various modifications of this invention can be made, or followed, in the light of the foregoing disclosure and discussion, without departing from the spirit or scope thereof.

I claim:
1. A method of stabilizing chlorinated ethylene polymer containing 1 to about 87 weight percent chlorine which comprises blending with 100 parts by weight of said polymer from 0.05 to 5 parts of a metal salt of an acyclic carboxylic acid containing from 10 to 24 carbon atoms wherein said metal is selected from the group consisting of Group I, II, III and IV metals, from 0.05 to 5 parts of an organic inhibitor selected from the group consisting of

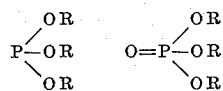

wherein each R is selected from the group consisting of alkyl and aryl radicals containing from 4 to 10 carbon atoms, and from 0.01 to 1 part of an antioxidant having the formula

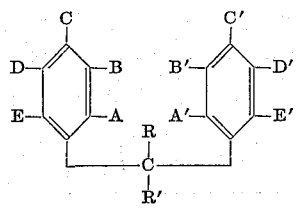

wherein one of the group A, B, C, D and E and one of the group A', B', C', D' and E' is a hydroxyl group, two of each of said groups are hydrogen, one of each group is a methyl and one of each said groups is an alkyl radical of 1 to 10 carbon atoms; R and R' are selected from the group consisting of hydrogen and alkyl radicals of 1 to 9 carbon atoms and R plus R' does not contain more than 9 carbon atoms.

2. The method of claim 1 wherein said carboxylic acid is chlorinated.
3. The method of claim 1 wherein said ethylene polymer contains from 15 to 50 weight percent chlorine.
4. A method of stabilizing chlorinated ethylene polymer containing from 15 to 50 weight percent chlorine which comprises blending with 100 parts by weight of said polymer from 0.1 to 3 parts of barium stearate, from 0.1 to 3 parts of diphenylheptylphosphite and from 0.05 to 0.5 part of 4,4'-butylidene-bis-(6-tert-butyl-cresol).
5. A method of stabilizing chlorinated ethylene polymer containing from 1 to about 87 weight percent chlorine which comprises blending with said polymer from about 0.05 to 5 parts of a metal salt of an acyclic carboxylic acid containing from 10 to 24 carbon atoms, from about 0.05 to 5 parts of an organic inhibitor selected from the group consisting of

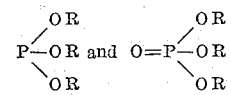

wherein each R is selected from the group consisting of alkyl and aryl radicals containing from 4 to 10 carbon atoms, and from about 0.01 to 1 part of an alkylidene alkyl-substituted cresol.

6. Chlorinated ethylene polymer containing from 1 to about 87 weight percent chlorine and stabilized per 100 parts by weight of polymer with from 0.05 to 5 parts of metal salt of an acyclic carboxylic acid containing from 10 to 24 carbon atoms wherein said metal is selected from the group consisting of Group I, II, II and IV metals, from 0.05 to 5 parts of an organic inhibitor selected from the group consisting of

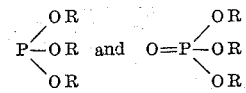

wherein each R is selected from the group consisting of alkyl and aryl radicals containing from 4 to 10 carbon atoms, and from 0.01 to 1 part of an antioxidant having the formula

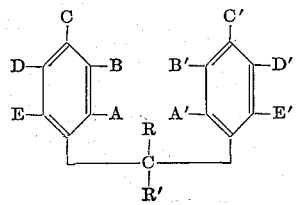

wherein one of the group A, B, C, D and E and one of the group A', B', C', D' and E' is a hydroxyl group, two of each of said groups are hydrogen, one of each group is a methyl and one of each said groups is an alkyl radical of 1 to 10 carbon atoms; R and R' are selected from the group consisting of hydrogen and alkyl radicals of 1 to 9 carbon atoms and R plus R' does not contain more than 9 carbon atoms.

7. The composition of claim 6 wherein said carboxylic acid is chlorinated.
8. The composition of claim 6 wherein said antioxidant is a 4,4'-lower alkylidene (lower alkyl-m-cresol).
9. Chlorinated ethylene polymer containing from 15 to 50 weight percent chlorine stabilized per 100 parts by weight of polymer with from 0.1 to 3 parts of barium stearate, from 0.1 to 3 parts of diphenylheptylphosphite and from 0.05 to 0.5 part of 4,4'-butylidene-bis-(6-tert-butyl-cresol).

10. The composition of claim 9 wherein said polymer is polyethylene.

11. A chlorinated ethylene polymer containing from 1 to about 87 weight percent chlorine and stabilized with from about 0.05 to 5 parts of a metal salt of an acyclic carboxylic acid containing from 10 to 24 carbon atoms, from about 0.05 to 5 parts of an organic inhibitor selected from the group consisting of

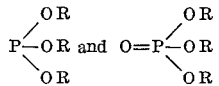

wherein each R is selected from the group consisting of alkyl and aryl radicals containing from 4 to 10 carbon atoms, and from 0.01 to 1 part of an alkylidene alkyl-substituted cresol.

References Cited by the Examiner

UNITED STATES PATENTS

| | | | |
|---|---|---|---|
| 2,590,059 | 3/1952 | Winkler | 260—45.75 |
| 2,752,319 | 6/1956 | Lipke | 260—45.85 |
| 2,918,451 | 12/1959 | Elliott | 260—45.85 |
| 2,935,491 | 5/1960 | Mack | 260—45.85 |
| 2,945,837 | 7/1960 | Eifert et al. | 260—45.85 |
| 2,969,339 | 1/1961 | Dohr et al. | 260—23 XR |
| 2,985,617 | 5/1961 | Salyer et al. | 260—45.7 |
| 3,115,465 | 12/1963 | Orloff et al. | 260—45.95 |

FOREIGN PATENTS 577,252  7/1959  Belgium.

LEON J. BERCOVITZ, *Primary Examiner.*

ALFONSO D. SULLIVAN, MILTON STERMAN,
*Examiners.*

J. H. HALL, T. D. KERWIN, R. W. GRIFFIN,
*Assistant Examiners.*